(12) United States Patent
Cheng et al.

(10) Patent No.: US 10,220,480 B2
(45) Date of Patent: Mar. 5, 2019

(54) SPINDLE SPEED ADJUSTING DEVICE IN MACHINING AND METHOD THEREOF

(71) Applicant: National Chung Cheng University, Chia-yi County (TW)

(72) Inventors: Chih-Chun Cheng, Tainan (TW); Ping-Chun Tsai, Taipei (TW); Wen-Nan Cheng, Tainan (TW); Yu-Hsin Kuo, Taichung (TW); Yin-Chun Cheng, Taichung (TW); Yu-Sheng Chiu, Changhua County (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 0 days.

(21) Appl. No.: 15/600,865

(22) Filed: May 22, 2017

(65) Prior Publication Data
US 2018/0130489 A1 May 10, 2018

(30) Foreign Application Priority Data
Nov. 10, 2016 (TW) .............................. 105136700 A

(51) Int. Cl.
*B23Q 15/12* (2006.01)
*B23Q 17/09* (2006.01)
*G05B 19/401* (2006.01)

(52) U.S. Cl.
CPC ......... *B23Q 17/0976* (2013.01); *B23Q 15/12* (2013.01); *G05B 19/401* (2013.01);
(Continued)

(58) Field of Classification Search
CPC ................................ G11B 15/46; G11B 15/43
(Continued)

(56) References Cited

U.S. PATENT DOCUMENTS

| 5,784,273 A | 7/1998 | Madhavan |
| 7,933,679 B1 | 4/2011 | Kulkarni et al. |

(Continued)

FOREIGN PATENT DOCUMENTS

| CN | 101332585 A | 12/2008 |
| TW | 201545833 A | 12/2015 |

(Continued)

OTHER PUBLICATIONS

Taiwan Patent Office "Office Action" dated Apr. 19, 2017, Taiwan.

*Primary Examiner* — Ziaul Karim
(74) *Attorney, Agent, or Firm* — WPAT, PC

(57) ABSTRACT

A spindle speed adjusting device in machining is provided, which may include a plurality of signal detection modules, a signal capturing module and a signal processing module. Each of the signal detection modules may keep measuring the vibration signals in machining. The signal capturing module may capture the vibration signals. The signal processing module may execute a transmissibility analysis to obtain the transmissibility between the signal detection modules, and execute a frequency response fitting according to the transmissibility to obtain a plurality of system dynamic parameters, and then execute a stability lobe diagram analysis to calculate the optimized spindle speed of the machining tool so as to make the machining tool operate at the optimized spindle speed. The signal processing module may repeatedly execute the transmissibility analysis, the frequency response fitting and the stability lobe diagram analysis to keep updating the optimized spindle speed until the machining process ends.

10 Claims, 14 Drawing Sheets

(52) U.S. Cl.
CPC .............. *G05B 2219/37435* (2013.01); *G05B 2219/41256* (2013.01); *G05B 2219/49077* (2013.01)

(58) Field of Classification Search
USPC ........................................................ 700/173
See application file for complete search history.

(56) References Cited

U.S. PATENT DOCUMENTS

| | | | | |
|---|---|---|---|---|
| 2006/0111018 | A1* | 5/2006 | Kopp | B23F 17/001 451/5 |
| 2011/0222980 | A1* | 9/2011 | Kuo | B23Q 11/0039 409/80 |
| 2011/0295556 | A1* | 12/2011 | Hedin | G01H 1/003 702/182 |
| 2012/0093598 | A1* | 4/2012 | Ando | B23Q 17/007 408/16 |
| 2015/0254336 | A1* | 9/2015 | Besuchet | G05B 15/02 707/737 |

FOREIGN PATENT DOCUMENTS

| | | |
|---|---|---|
| WO | WO2008108656 A1 | 9/2008 |
| WO | WO2013088849 A1 | 6/2013 |

\* cited by examiner

SPINDLE SPEED ADJUSTING DEVICE IN MACHINING AND METHOD THEREOF

CROSS REFERENCE TO RELATED APPLICATION

All related applications are incorporated by reference. The present application is based on, and claims priority from, Taiwan Application Serial Number 105136700, filed on Nov. 10, 2016, the disclosure of which is hereby incorporated by reference herein in its entirety.

TECHNICAL FIELD

The technical field relates to a spindle speed adjusting device in machining, in particular to a spindle speed adjusting device in machining capable of optimizing the spindle speed of a machining tool in real time. The technical field relates to the spindle speed adjusting method of the device.

BACKGROUND

Machining tools, such as CNC lathe and milling machine, etc., are now in common use over various industries. However, when a user uses a machining tool to machine a workpiece, the surface roughness of the workpiece may be influenced because of chatter generated during the machining process. Accordingly, the user needs to prevent from chatter so as to make sure that the machining stability and the machining precision can be increased.

In general, there are two major methods for detecting chatter generated by machining tools: (1) Chatter prediction method: the user needs to use an impact hammer to hit the spindle and the cutter of the machining tool in order to obtain the systematic characteristic parameters, and then draws a stability lobe diagram to select a stable spindle speed for the machining process. However, this method can only be executed after the machining tool is turned off; besides, as this method assumes the whole machining process is ideal, the systematic characteristic parameters measured by this method must be, to a certain extent, different from those measured during the machining tool is actually performing the machining process, in particular to machining impedance (workpiece impedance); (2) Chatter prevention method: when the machining tool is machining the workpiece, the users can use sensors to measure and analyze various signals generated during the machining process, and then determine whether chatter is going to occur according to the analysis result. Once the current spindle speed is identified to result in chatter occurrence, the spindle speed of the machine tool should be immediately adjusted to prevent from chatter. However, this method cannot find the best spindle speed of the machining tool, and fails to provide an objective criterion for adjusting spindle speed; also, as this method cannot completely prevent from chatter, the machining precision of the workpiece cannot be effectively improved. As described above, both conventional methods cannot make sure that workpieces can be processed in high machining precision.

Currently, there is a method developed for estimating machining process parameters. According to this method, the user should select a spindle speed adjusting range first. Then, the user should take trail cuts by keep adjusting the spindle speed within the above range, and identify the systematic dynamic parameters by operational model analysis. Next, the user should draw a stability lobe diagram according to the above parameters to find a best spindle speed within the above range. Afterward, the user should take trail cuts again according to the best spindle speed and different cutting depths, and measure and process vibration signals generated during the trail cuts to obtain vibration signal characteristics. Finally, the user should compare the vibration signal characteristics with the predetermined thresholds to determine whether chatter occurs so as to determine a best cutting depth.

However, for the machining tool, the contact area between the workpiece and the cutter, the moving path of the cutter and other operational conditions always keep changing; for the reason, the best spindle speed also keeps changing. Thus, the above method can just determine the best spindle speed for the trail cuts, but cannot properly adjust the spindle speed according to the condition of the cutter and the other operational conditions. Accordingly, the conventional method cannot effectively improve the machining precision of workpieces as well.

In addition, according to the above method, as the user should take trail cuts, but some workpieces may be extremely expensive, therefore, taking trail cuts on these workpieces will result in a lot of cost, which cannot satisfy actual requirements, so its application is restricted.

Therefore, it has become an important issue to provide a spindle speed adjusting technology to effectively improve the shortcomings of prior art.

SUMMARY

Therefore, it is a primary objective of the present disclosure to provide a spindle speed adjusting device in machining and method thereof to solve the problems of prior art.

To achieve the foregoing objective, the present disclosure provides a spindle speed adjusting device in machining is provided, which may include a plurality of signal detection modules, a signal capturing module and a signal processing module. Each of the signal detection modules may keep measuring a vibration signal generated when a machining tool performing a machining process until the machining process ending. The signal capturing module may capture the vibration signals. The signal processing module may to execute a transmissibility analysis according to the vibration signals to obtain a transmissibility between the signal detection modules, and execute a frequency response fitting according to the transmissibility to obtain a plurality of system dynamic parameters, and then execute a stability lobe diagram analysis according to the systematic dynamic parameters so as to calculate an optimized spindle speed of the machining tool and make the machining tool operate at the optimized spindle speed. The signal processing module may repeatedly execute the transmissibility analysis, the frequency response fitting and the stability lobe diagram analysis so as to keep updating the optimized spindle speed until the machining process ends.

In a preferred embodiment of the present disclosure, the transmissibility analysis may include a power spectral density function analysis.

In a preferred embodiment of the present disclosure, the system dynamic parameters may include a natural frequency and a modal damping ratio of the machining tool.

In a preferred embodiment of the present disclosure, the machining tool may include a spindle mount, a spindle, a cutter and a cutter holder; the spindle may be mounted on the spindle mount, the cutter holder may be mounted on the spindle, and the cutter may be mounted on the cutter holder.

In a preferred embodiment of the present disclosure, the signal processing module may execute a curve fitting according to the transmissibility to obtain a curve peak, and then calculate the natural frequency according to the curve peak.

In a preferred embodiment of the present disclosure, the signal detection modules may be mounted on the spindle.

In a preferred embodiment of the present disclosure, the signal processing module may execute a numerical analysis according to the natural frequency to identify the modal damping ratio.

To achieve the foregoing objective, the present disclosure further provides a spindle speed adjusting method in machining, which may include the following steps: keeping measuring a vibration signal generated when a machining tool performing a machining process by a plurality of signal detection modules until the machining process ends; capturing the vibration signals by a signal capturing module; executing a transmissibility analysis according to the vibration signals by a signal processing module to obtain a transmissibility between the signal detection modules; executing a frequency response fitting according to the transmissibility by the signal processing module to obtain a plurality of system dynamic parameters; executing a stability lobe diagram analysis according to the systematic dynamic parameters so as to calculate an optimized spindle speed of the machining tool by the signal processing module and make the machining tool operate at the optimized spindle speed; and repeatedly executing the transmissibility analysis, the frequency response fitting and the stability lobe diagram analysis by the signal processing module so as to keep updating the optimized spindle speed until the machining process ends.

In a preferred embodiment of the present disclosure, the transmissibility analysis may include a power spectral density function analysis.

In a preferred embodiment of the present disclosure, the system dynamic parameters may include a natural frequency and a modal damping ratio of the machining tool.

In a preferred embodiment of the present disclosure, the method may further include the following step: executing a curve fitting according to the transmissibility to obtain a curve peak, and then calculate the natural frequency according to the curve peak by the signal processing module.

In a preferred embodiment of the present disclosure, the method may further include the following step: executing a numerical analysis according to the natural frequency by the signal processing module to identify the modal damping ratio.

The spindle speed adjusting device in machining and method thereof according to the present disclosure have the following advantages:

(1) According to one embodiment of the present disclosure, the signal processing module of the spindle speed adjusting device in machining can execute a stability lobe diagram analysis according to the systematic dynamic parameters of a machining tool so as to precisely calculate an optimized spindle speed of the machining tool, and then make the machining tool operate at the optimized spindle speed; in this way, workpieces can be processed in high machining precision and the machining efficiency can also be increased.

(2) According to one embodiment of the present disclosure, the signal processing module of the spindle speed adjusting device in machining can execute the stability lobe diagram analysis according to the systematic dynamic parameters of the machining tool to calculate the optimized spindle speed of the machining tool in order to prevent from chatter; therefore, the machining tool can machine workpieces without chatter, so the machining quality of workpieces can be effectively improved.

(3) According to one embodiment of the present disclosure, the signal processing module of the spindle speed adjusting device in machining can repeatedly execute the transmissibility analysis, the frequency response fitting and the stability lobe diagram analysis to update the optimized spindle speed of the machining tool until the machining process ends; in this way, the spindle speed of the machining tool can always be optimized during the whole machining process even if the contact area between the workpiece and the cutter, the moving path of the cutter and other operational conditions change; accordingly, the machining precision of workpieces can be further improved.

(4) According to one embodiment of the present disclosure, the signal processing module of the spindle speed adjusting device in machining can execute the transmissibility analysis, the frequency response fitting and the stability lobe diagram analysis in real time to calculate the optimized spindle speed of the machining tool without trail cuts, so can be applied to workpieces with high price; therefore, the application of the spindle speed adjusting device can be more comprehensive.

(5) According to one embodiment of the present disclosure, the signal processing module of the spindle speed adjusting device in machining can execute the transmissibility analysis, the frequency response fitting and the stability lobe diagram analysis, etc., in real time, and the above steps can always find the optimized spindle speed to improve the machining precision even if in different machining parameters (e.g. feed rate, cutting depth and cutting width) and different workpiece material characteristics, which is more flexible in use.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
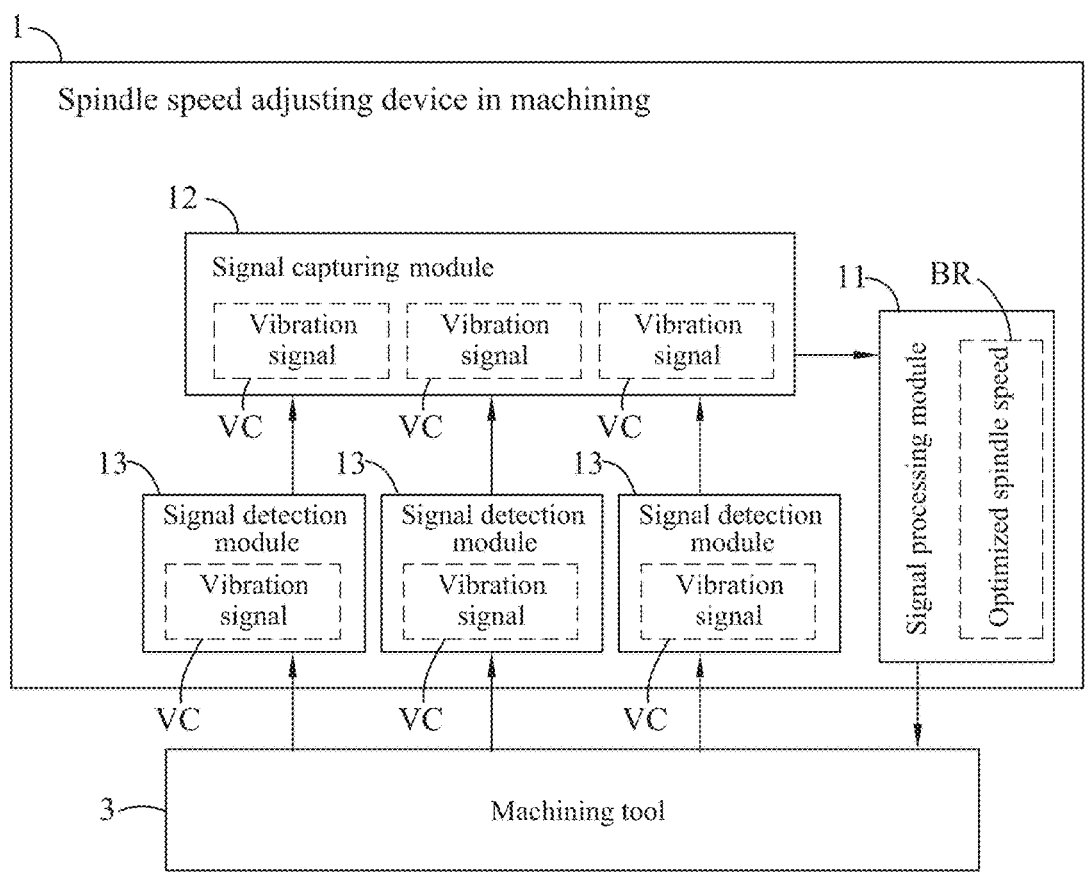
FIG. 1 is a block diagram of a spindle speed adjusting device in machining of a first embodiment in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a spindle speed adjusting device in machining of a first embodiment in accordance with the present disclosure. As shown in FIG. 1, the spindle speed adjusting device in machining 1 may include a plurality of signal detection modules 13, a signal capturing module 12 and a signal processing module 11.

The signal detection modules 13 may be vibration signal sensor or other similar devices, and each can keep measuring the vibration signal VC generated when a machining tool 3 performs a machining process until the machining process ends.

The signal capturing module 12 may be signal detector or other similar devices, which can capture the vibration signals VC.

The signal processing module 11 may be a computer or other devices with computation function, which can execute the transmissibility analysis according to the vibration signals VC, which may include a power spectral density function analysis, in order to obtain the transmissibility between the signal detection modules 13.

Next, the signal processing module 11 may execute a frequency response fitting according to the transmissibility so as to identify a plurality of systematic dynamic parameters. The systematic dynamic parameters may include a natural frequency and a modal damping ratio of the machining tool 3. More specifically, the signal processing module 11 may execute a curve fitting according to the transmissibility to obtain a curve peak; further, and then the signal processing module 11 may executes a numerical analysis according to the natural frequency to identify the modal damping ratio.

Afterward, the signal processing module 11 may execute a stability lobe diagram analysis according to the systematic dynamic parameters in order to calculate an optimized spindle speed BR of the machining tool 3 and make the machining tool 3 operate at the optimized spindle speed BR.

During the whole machining process, the signal processing module 11 may repeatedly execute the transmissibility analysis, the frequency response fitting and the stability lobe diagram analysis to keep updating the optimized spindle speed BR until the machining process ends. The spindle speed adjusting device in machining 1 in the embodiment may be integrated into the machining tool 3 or be an independent device.

The cutter of the machining tool 3, such as milling machine and the like, needs to move on the surface of the workpiece at a certain depth during the machining process; therefore, the moving path of the cutter, the contact area between the cutter and the workpiece, and other operational conditions may keep changing. When these operational conditions change, the systematic dynamic parameters of the machining tool 3 may also change; for the reason, the current spindle speed of the machining tool 3 may no longer be the optimized spindle speed.

However, in the embodiment, the signal processing module 11 may repeatedly execute the transmissibility analysis, the frequency response fitting and the stability lobe diagram analysis so as to keep updating the optimized spindle speed BR until the machining process ends. Thus, the spindle speed of the machining tool 3 can always be adjusted to be the optimized spindle speed BR during the whole machining process even if the systematic dynamic parameters change with the operational conditions; therefore, the workpiece can have best machining precision.

Figure 2:
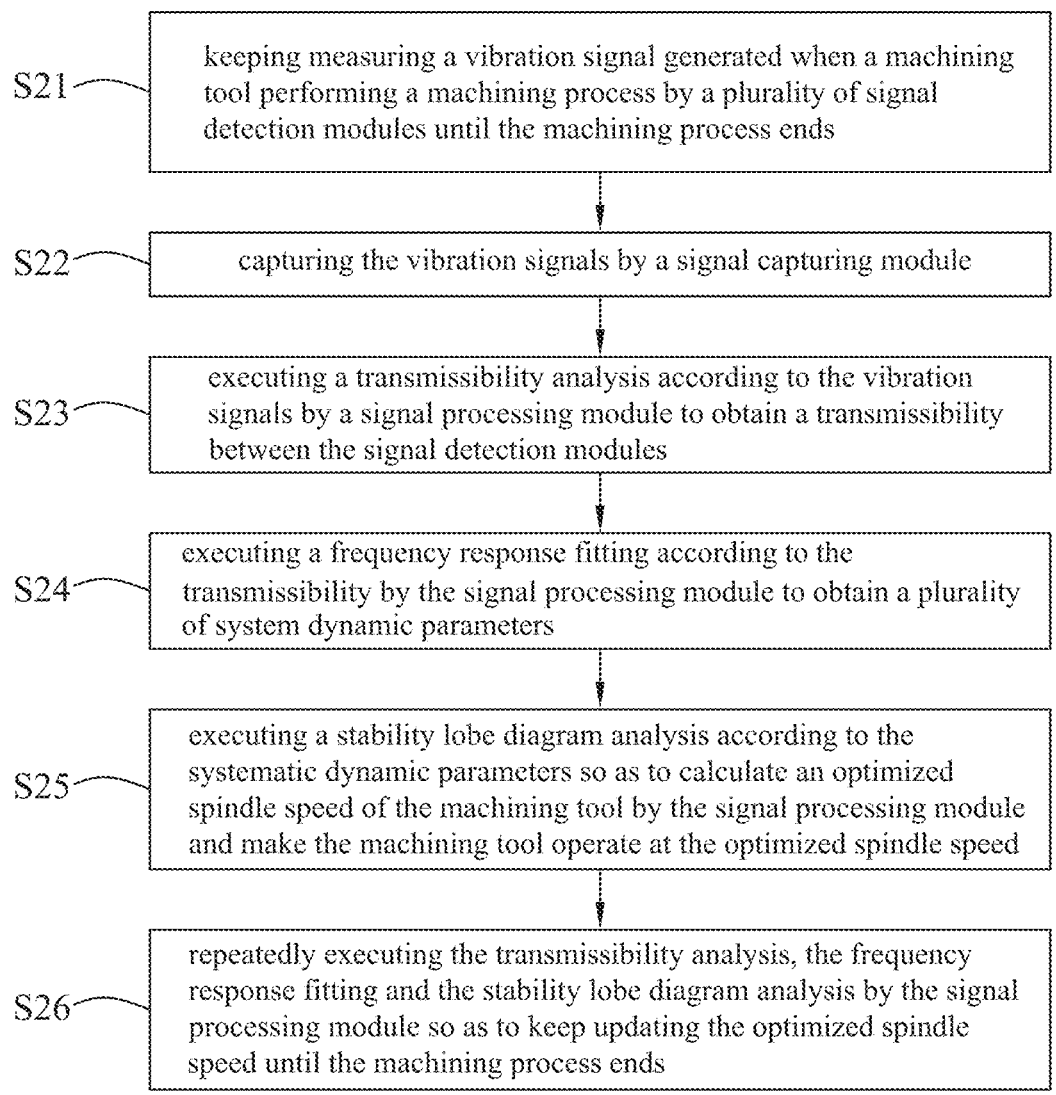
FIG. 2 is a flow chart of the first embodiment in accordance with the present disclosure.

Please refer to FIG. 2, which is a flow chart of the first embodiment in accordance with the present disclosure. As shown in FIG. 2, the embodiment may include the following steps:

Step S21: keeping measuring a vibration signal generated when a machining tool performing a machining process by a plurality of signal detection modules until the machining process ends.

Step S22: capturing the vibration signals by a signal capturing module;

Step S23: executing a transmissibility analysis according to the vibration signals by a signal processing module to obtain a transmissibility between the signal detection modules.

Step S24: executing a frequency response fitting according to the transmissibility by the signal processing module to obtain a plurality of system dynamic parameters.

Step S25: executing a stability lobe diagram analysis according to the systematic dynamic parameters so as to calculate an optimized spindle speed of the machining tool by the signal processing module and make the machining tool operate at the optimized spindle speed.

Step S26: repeatedly executing the transmissibility analysis, the frequency response fitting and the stability lobe diagram analysis by the signal processing module so as to keep updating the optimized spindle speed until the machining process ends.

It is worthy to note that that the conventional methods cannot precisely estimate a best spindle speed of a machining tool when the machining tool machines a workpiece, so cannot make sure that the workpiece can be processed in high machining precision. On the contrary, according to one embodiment of the present disclosure, the signal processing module of the spindle speed adjusting device in machining can execute a stability lobe diagram analysis according to the systematic dynamic parameters of a machining tool so as to precisely calculate an optimized spindle speed of the machining tool, and then make the machining tool operate at the optimized spindle speed; in this way, workpieces can be processed in high machining precision and the machining efficiency can also be increased.

Besides, the contact area between the workpiece and the cutter, the moving path of the cutter and other operational conditions always keep changing during the machining process; thus, the best spindle speed keeps changing as well; however, the conventional methods cannot adjust the spindle speed of the machining tool in real time to make the spindle speed of the machining tool always be optimized during the whole machining process, so the workpiece cannot be processed by high machining precision. On the contrary, according to one embodiment of the present disclosure, the signal processing module of the spindle speed adjusting device in machining can repeatedly execute the transmissibility analysis, the frequency response fitting and the stability lobe diagram analysis to update the optimized spindle speed of the machining tool until the machining process ends; in this way, the spindle speed of the machining tool can always be optimized during the whole machining process even if the contact area between the workpiece and the cutter, the moving path of the cutter and other operational conditions change; accordingly, the machining precision of workpieces can be further improved.

In addition, the conventional methods need to perform trial cuts, but some workpieces may be extremely expensive, therefore, the trail cuts will result in a lot of cost, which cannot satisfy actual requirements, so its application is restricted. On the contrary, according to one embodiment of the present disclosure, the signal processing module of the spindle speed adjusting device in machining can execute the transmissibility analysis, the frequency response fitting and the stability lobe diagram analysis in real time to calculate the optimized spindle speed of the machining tool without trail cuts, so can be applied to workpieces with high price; therefore, the application of the spindle speed adjusting device can be more comprehensive.

Moreover, according to one embodiment of the present disclosure, the signal processing module of the spindle speed adjusting device in machining can execute the stability lobe diagram analysis according to the systematic dynamic parameters of the machining tool to calculate the optimized spindle speed of the machining tool in order to prevent from chatter; therefore, the machining tool can machine workpieces without chatter, so the machining quality of workpieces can be effectively improved.

Furthermore, according to one embodiment of the present disclosure, the signal processing module of the spindle speed adjusting device in machining can execute the transmissibility analysis, the frequency response fitting and the stability lobe diagram analysis, etc., in real time, and the above steps can always find the optimized spindle speed to improve the machining precision even if in different machining parameters (e.g. feed rate, cutting depth and cutting width) and different workpiece material characteristics, which is more flexible in use. As described above, the present disclosure definitely has an inventive step.

Figure 3:
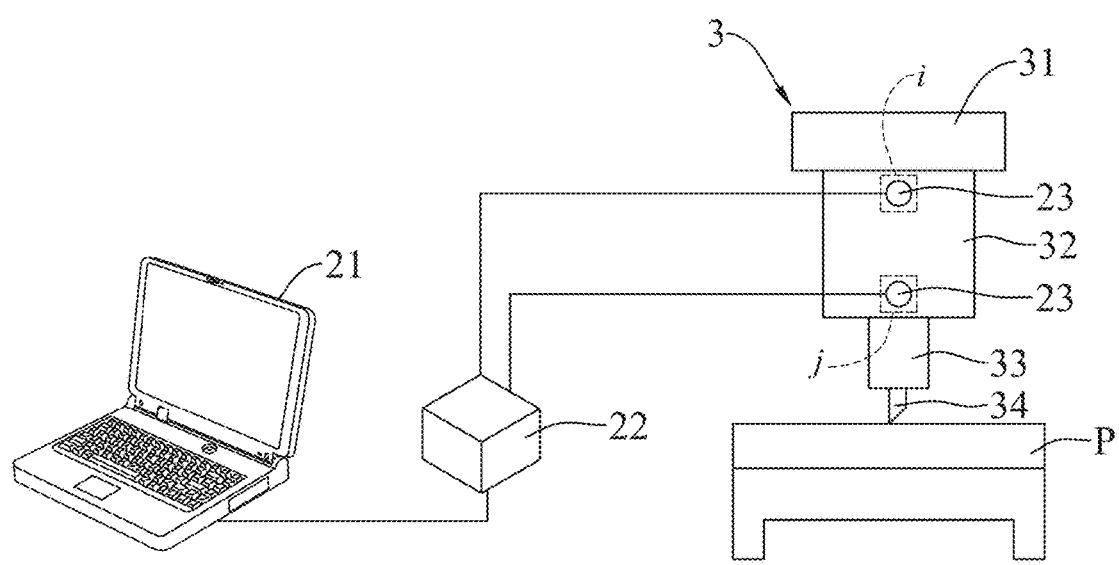
FIG. 3 is a block diagram of a spindle speed adjusting device in machining of a second embodiment in accordance with the present disclosure.

Please refer to FIG. 3, which is a block diagram of a spindle speed adjusting device in machining of a second embodiment in accordance with the present disclosure. As shown in FIG. 3, the spindle speed adjusting device in machining 2 may include a plurality of vibration signal sensors 23, a vibration signal detector 22 and a computer 21. The spindle speed adjusting device in machining 2 may be coupled to a machining tool 3; the machining tool 3 may include a spindle mount 31, a spindle 32, a cutter holder 33 and a cutter 34; the spindle 32 may be mounted on the spindle mount 31, the cutter holder 33 may be mounted on the spindle 32, and the cutter 34 may be mounted on the cutter holder 33.

The vibration signal sensors 23 can be mounted on different positions of the spindle 32 of the machining tool 3; in the embodiment, one of the vibration signal sensors 23 can be mounted at the position i, and the other one can be mounted at the position j so as to keep measuring vibration signals from the machining tool 3 when the machining tool 3 is machining the workpiece P until the machining process ends.

The vibration signal detector 23 can capture the vibration signals measured by the vibration signal sensors 23 and then transmit the vibration signals to the computer 21.

The computer 21 can execute a transmissibility analysis, which may include a power spectral density function analysis, in order to obtain a transmissibility between the vibration signal sensors 23.

The transmissibility can be defined as the following equation:

$$T_{ij}(s) = \frac{G_{ij}(s)}{G_{jj}(s)}, \quad (1)$$

In the above equation, i and j respectively represent the vibration signal sensors 23 mounted at different positions; $G_{jj}(s)$ represent auto power spectral density function of the vibration signal sensor 23 mounted at the position i, and $G_{ij}(s)$ represents cross power spectral density function of the vibration signals measured by the vibration signal sensors 23 mounted at the positions i and j. Consider a N-degree-of-freedom system, Tij(s) of Equation 1 can be expressed as:

$$T_{ij}(s) = \frac{\sum_{k=1}^{N} H_{ik}(s)F_k(s)}{\sum_{k=1}^{N} H_{jk}(s)F_k(s)}; \quad (2)$$

In the above equation, k represent different force vibrations; F are external forces applied; H are transfer functions of the system (also known as frequency response functions) and can be defined as:

$$H_{ik}(s) = \sum_{r=1}^{N} \left( \frac{\phi_{ir}L_{kr}}{i\omega - \lambda_r} + \frac{\phi_{ir}^* L_{kr}^*}{i\omega - \lambda_r^*} \right); \quad (3)$$

In the above equation, φ are modal vectors; L are modal participation factors; L represent poles of the system; resonance occurs when iω is close to the poles of the system; then, Equation (2) can be modified as:

$$\lim_{s \to \lambda_r} T_{ij}(s) = \frac{\sum_{k=1}^{N} \phi_{ir}L_{kr}F_k(s)}{\sum_{k=1}^{N} \phi_{jr}L_{kr}F_k(s)} = \frac{\phi_{ir}}{\phi_{jr}}. \quad (4)$$

According to Equation (4), it is obvious that the external force can be cancelled out, so the transmissibility is uncorrelated to the external force; Moreover, it is worthy to note that the transmissibility difference between the two force vibrations should be close to zero when the resonance occurs, and can be expressed as:

$$\lim_{s \to \lambda_r} [T_{ij}^k(s) - T_{ij}^l(s)] = 0; \quad (5)$$

In the above equation, k and l represent different force vibrations.

Afterward, the computer 21 can execute a frequency response fitting according to the transmissibility to identify a plurality of systematic dynamic parameters, which may include a natural frequency and a model damping ratio of the machining tool 3.

As described above, the computer 21 can execute a frequency response fitting; during this step, the computer 21 can execute a curve fitting according to the transmissibility to obtain a curve peak, and then calculate the natural frequency according to the curve peak; in other words, the natural frequency of the spindle 32 and the cutter 34 can be obtained according to the peak value of the system by calculating the reciprocal of Equation (5). In order to calculate the modal damping ratio, the reciprocal of Equation (5) can be rewritten by a polynomial equation, as follows:

$$H_k(\omega) = \frac{N_k}{d} = \frac{\sum_{m=0}^{n} \Omega_m(\omega) B_{km}}{\sum_{m=0}^{m} \Omega_m(\omega) A_m} \quad (6)$$

In the above equation, $\Omega_j(\omega)=e^{(-i\omega T_s)m}$ is a discrete-time function; $T_s$ is signal sampling period; m is the order of identification; n is the maximum of order of identification; $B_{km}$ and $A_m$ are coefficients of the denominator and the numerator of the polynomial equation respectively; k is the number of the identification data. $B_{km}$ and $A_m$ can be expressed by matrix, as follows:

$$\theta=[\beta_l^T \ldots \beta_k^T \alpha^T]^T \quad (7)$$

In the above equation, $\beta_k$ and $\alpha$ can be expressed as:

$$\beta_k = \begin{bmatrix} B_{k0} \\ B_{k1} \\ \vdots \\ B_{kn} \end{bmatrix}; \alpha = \begin{bmatrix} A_0 \\ A_1 \\ \vdots \\ A_n \end{bmatrix}$$

Furthermore, coefficients of the frequency response function can be estimated via using non-linear least square method to calculate an error $\varepsilon_k$ of each frequency of each piece of the identification data, as follows:

$$\varepsilon_k(\omega, \theta) = W_k(\omega) \left\{ \frac{N_k(\omega, \beta_k)}{d(\omega, \alpha)} - H_k(\omega) \right\} \quad (8)$$

In the above equation, $W_k(\omega_f)$ is weighting function and can be expressed as:

$$W_k(\omega_f) = \frac{1}{\sqrt{\text{var}\{H_k(\omega_f)\}}} \quad (9)$$

The coefficients $\alpha$ of denominator can be estimated via analyzing the its gradients calculated by using partial differential. Next, the computer 21 can calculate an eigenvalue of the adjoint matrix of a and then calculate a pole $e^{\lambda_r T_s}$ of the system of the spindle 32 and the cutter 34 by numerical analysis. Then, the natural frequency can be substituted into which to estimate the modal damping ratio $\xi$ of the system of the spindle 32 and the cutter 34, as shown in the following equation:

$$\lambda_r = -\xi\omega_n \pm \sqrt{1-\xi^2 \omega_c^2} i \quad (10)$$

Moreover, the computer 21 can execute a stability lobe diagram analysis according to the systematic dynamic parameters, the natural frequency and the model damping ratio, to calculate an optimized spindle speed of the machining tool 3.

More specifically, the stability lobe formula can be expressed as:

$$\frac{f_c}{\Omega} = N + \frac{\varepsilon}{2\pi}; \quad (11)$$

$$\delta = \pi + 2\tan^{-1}\left(\frac{\text{Im}[R(\omega_c)]}{\text{Re}[R(\omega_c)]}\right); \quad (12)$$

$$b_{lim} = \frac{-1}{2k_c \text{Re}[R(\omega_c)]}; \quad (13)$$

In the above equations, $f_c=\omega_c/2\pi$ is chatter frequency; $\Omega$ is rotation speed (RPS) of the spindle 32; N is number of the cutting waves on the workpiece P curved by the cutter 34 after the cutter 34 rotates in a circle for one time; $\delta$ is number of the cutting waves. When $\delta$ is 0 or $2\pi$, it means the phase difference between the current cutting wave and the previous cutting wave is 0, so the machining status is stable; that is to say, chatter has yet to occur. In Equation (13), $k_c$ is cutting stiffness; $R(\omega_c)$ is frequency response function of the system of the spindle 32 and the cutter 34; $b_{lim}$ is critical depth of cut. Equation (12) can be modified as:

$$\frac{b_{lim} k_c}{k} = \frac{-1}{2k\text{Re}[R(\omega_c)]} \quad (14)$$

In the above equation, k is stiffness of the system of the spindle 32 and the cutter 34; the stability lobe diagrams of the system in different force vibrations can be obtained according to Equation (11), Equation (12) and Equation (14); therefore, the computer 21 can calculate the optimized spindle speed BR of the machining tool 3 according to the stability lobe diagrams and make the machining tool 3 operate in the optimized spindle speed BR.

The computer 21 can determine whether the machining process ends; if keeping receiving the vibration signals from the vibration signal sensors 22, the computer 21 determines that the machining process does not end; meanwhile, the computer 21 can execute the transmissibility analysis, the frequency response fitting and the stability lobe diagram analysis again to obtain the optimized spindle speed BR to replace the current spindle speed; the computer 21 will repeatedly execute the above steps to keep updating the optimized spindle speed BR. The computer 21 can determine that the machining process ends and stop executing the above steps if failing to receive the vibration signals from the vibration signal sensors 22.

As described above, the computer 21 can repeatedly execute the transmissibility analysis, the frequency response fitting and the stability lobe diagram analysis in real time to update the optimized spindle speed BR and then replace the current spindle speed until the machining process ends. Thus, the spindle speed of the machining tool 3 can be always optimized during the whole machining process; in this way, the workpiece P can be processed in high machining precision.

The spindle speed adjusting device in machining 2 can be directly integrated with the machining tool 3 or be an independent device; all of which are included in the claims of the present disclosure.

Figure 4:
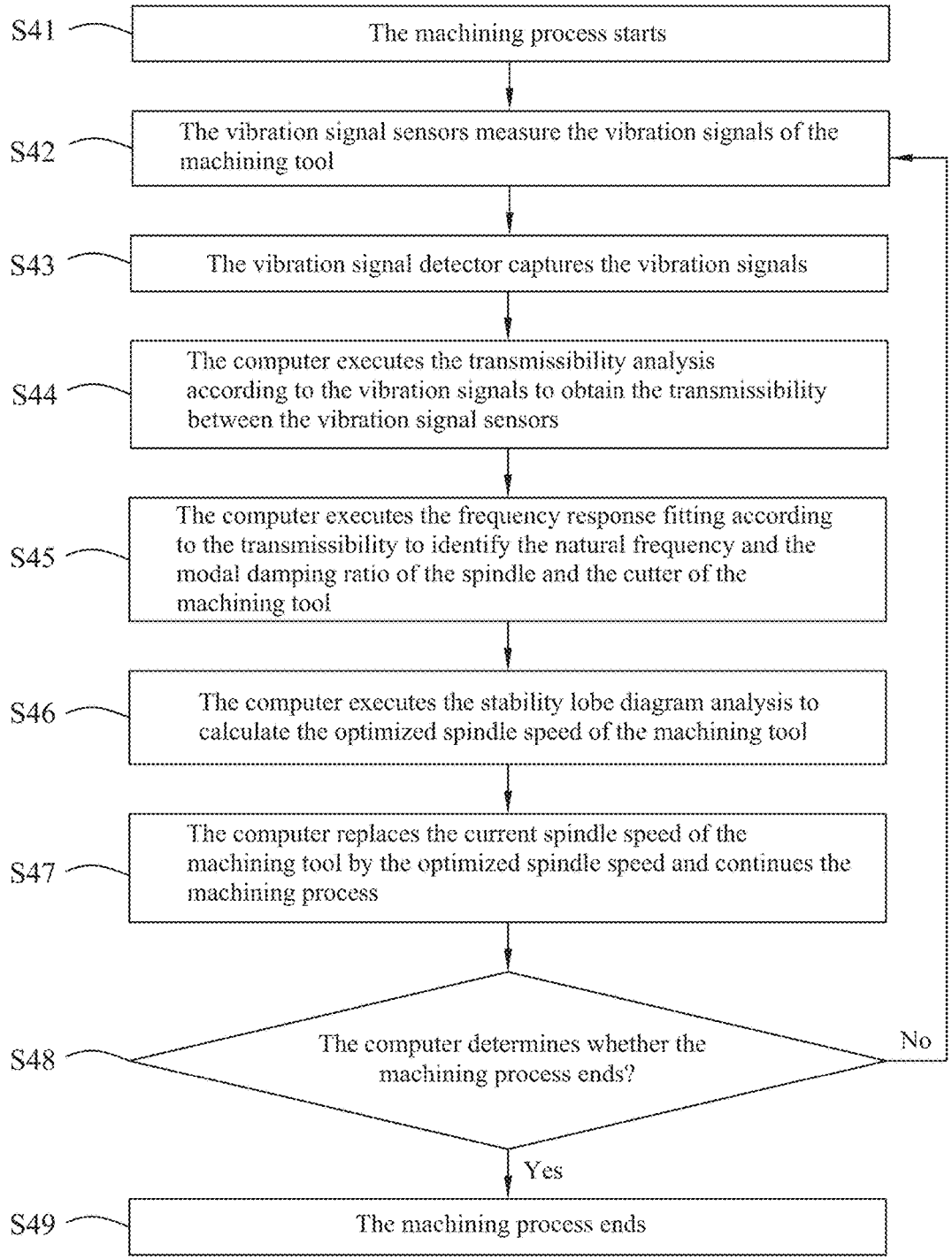
FIG. 4 is a flow chart of the second embodiment in accordance with the present disclosure.

Please refer to FIG. 4, which is a flow chart of the second embodiment in accordance with the present disclosure. As shown in FIG. 4, The embodiment may include the following steps:

Step S41: The machining process starts; then, the flow proceeds to Step S42.

Step S42: The vibration signal sensors measure the vibration signals of the machining tool; then, the flow proceeds to Step S43.

Step S43: The vibration signal detector captures the vibration signals; then, the flow proceeds to Step S44.

Step S44: The computer executes the transmissibility analysis according to the vibration signals to obtain the transmissibility between the vibration signal sensors; then, the flow proceeds to Step S45.

Step S45: The computer executes the frequency response fitting according to the transmissibility to identify the natural frequency and the modal damping ratio of the spindle and the cutter of the machining tool; then, the flow proceeds to Step S46.

Step S46: The computer executes the stability lobe diagram analysis to calculate the optimized spindle speed of the machining tool; then, the flow proceeds to Step S47.

Step S47: The computer replaces the current spindle speed of the machining tool by the optimized spindle speed and continues the machining process; then, the flow proceeds to Step S48.

Step S48: The computer determines whether the machining process ends? If it does, the flow proceeds to Step S49; if it does not, the flow returns to Step S42.

Step S49: The machining process ends.

Please refer to FIG. 5~FIG. 14, which are experimental data of the second embodiment in accordance with the present disclosure; FIG. 5~FIG. 14 shows the actual experimental results to prove the technical effect of the spindle speed adjusting device in machining 2 of the second embodiment.

Figure 5:
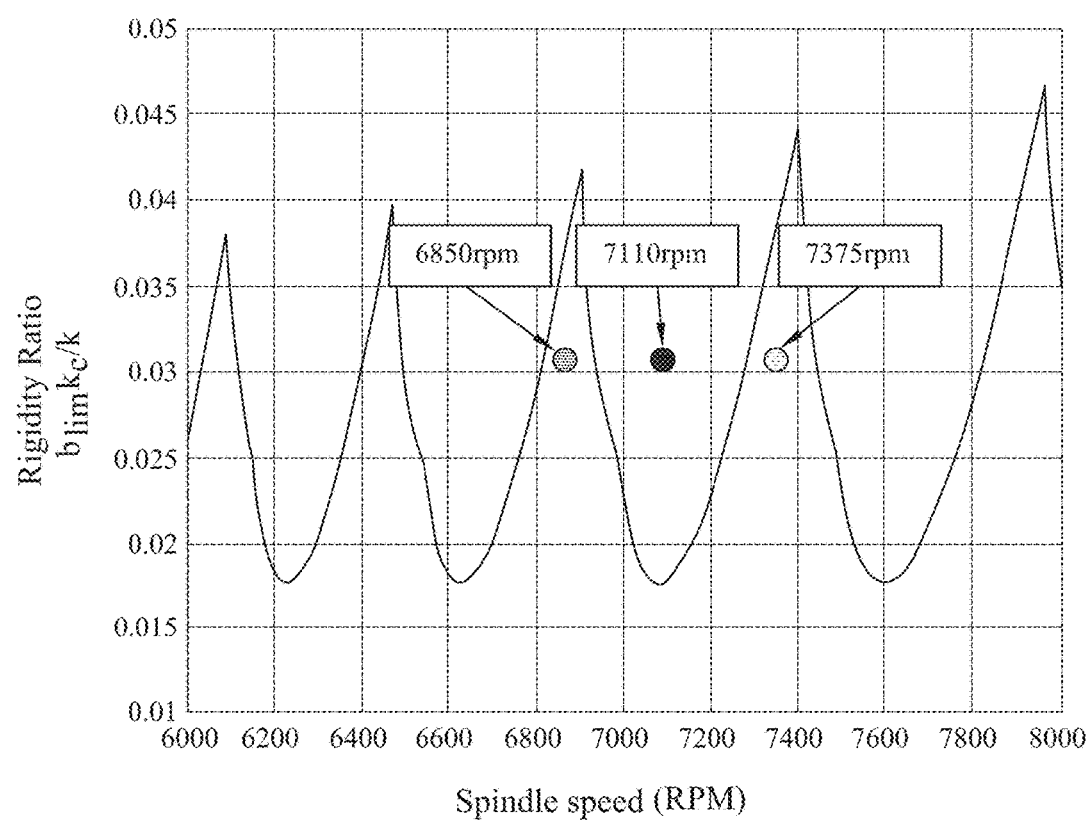
FIG. 5~FIG. 14 is experimental data of the second embodiment in accordance with the present disclosure.

First, when the machining tool 3 (in the embodiment, the machining tool 3 is milling machine) is turned off, we identify the systematic dynamic parameters, such as natural frequency and modal damping ratio, etc., of the spindle 32 and the cutter 34 via a modal impact testing, and then draw stability lobe diagrams, as shown in FIG. 5. The embodiment respectively selects 6850 RPM, 7110 RPM and 7375 RPM as the spindle speed to perform the machining process, where 6850 RPM and 7375 RPM are the best spindle speeds provided by the modal impact testing; the above three spindle speeds are obtained via the conventional method.

Figure 6:
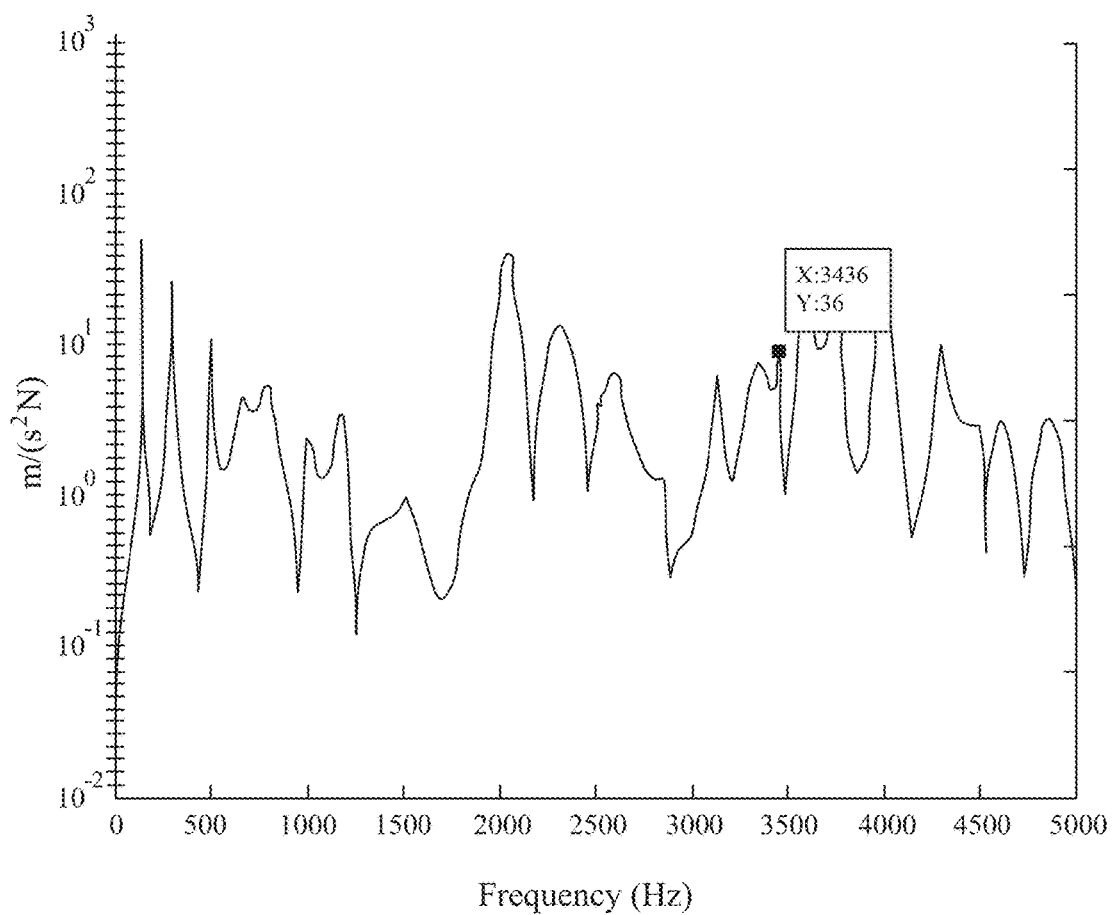
Figure 7:
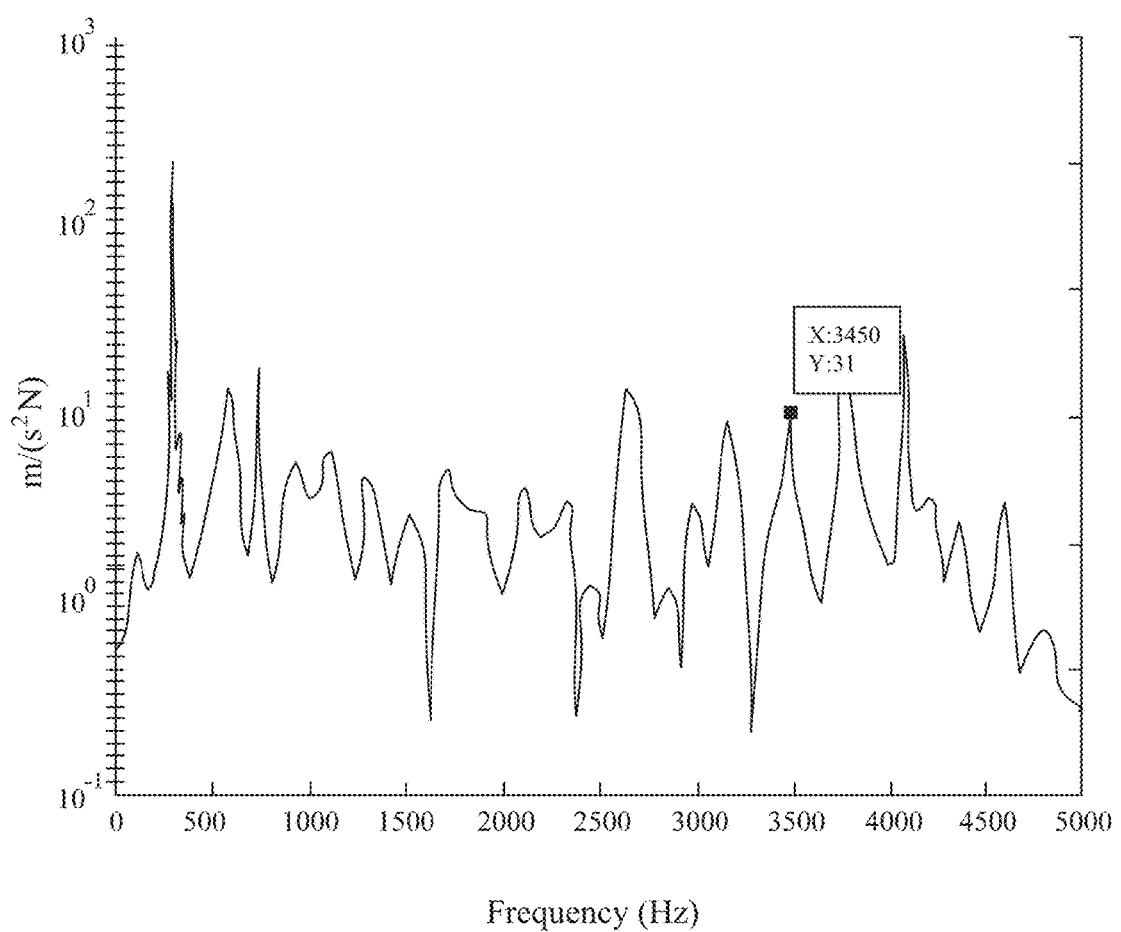

Next, we use the spindle speed adjusting device in machining 2 and the method thereof of the second embodiment to execute the machining process; we use 7375 RPM as the initial spindle speed to execute the machining process. FIG. 6 and FIG. 7 show the fitted frequency response functions in X direction and Y direction obtained by the computer 21 via the transmissibility analysis and the frequency response fitting at the initial spindle speed, 7375 RPM, where the peak value represents natural frequency.

Figure 8:
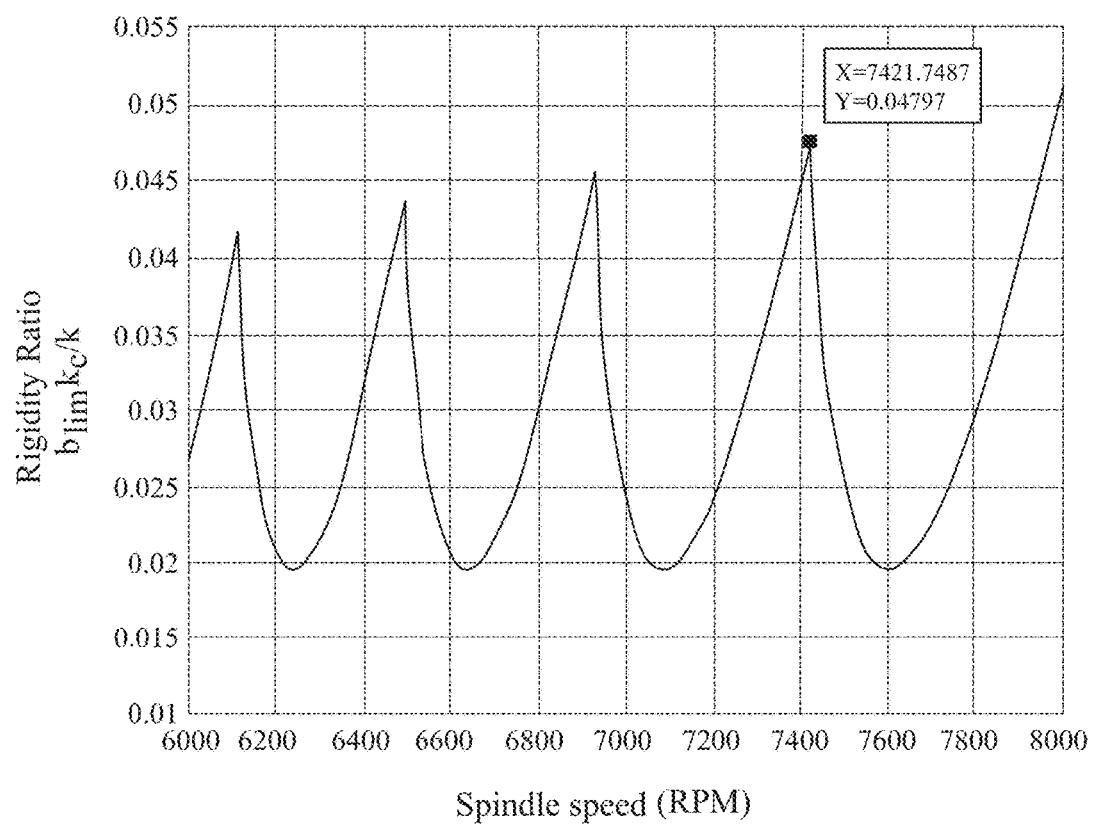

Afterward, the computer 21 can execute the stability lobe diagram analysis according to the natural frequency and the modal damping ratio of the spindle 32 and the cutter 34 to draw the stability lobe diagram in X direction and Y direction, as shown in FIG. 8. The computer 21 can determine that 7422 RPM is the optimized spindle speed at the moment, and then make the machining tool 3 operate in the optimized spindle speed, 7422 RPM, to perform the machining process.

Figure 9:
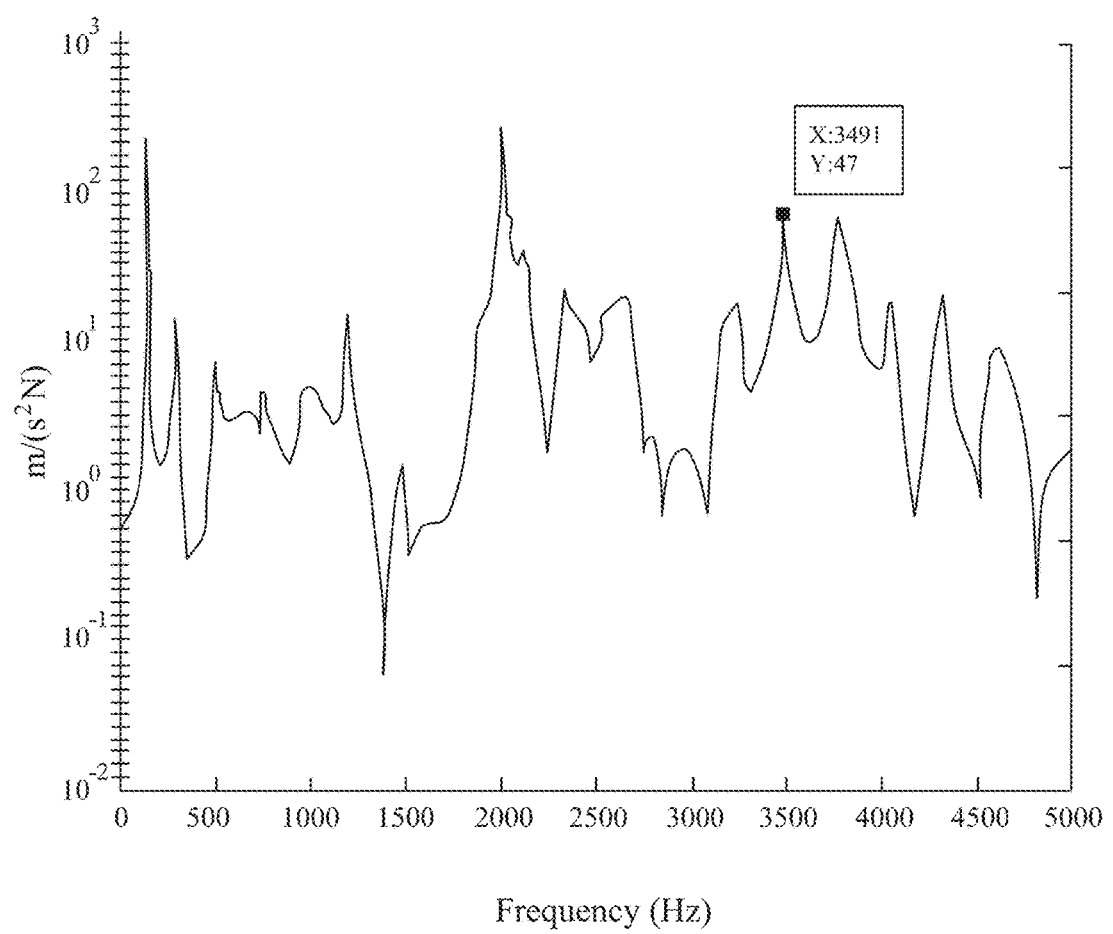
Figure 10:
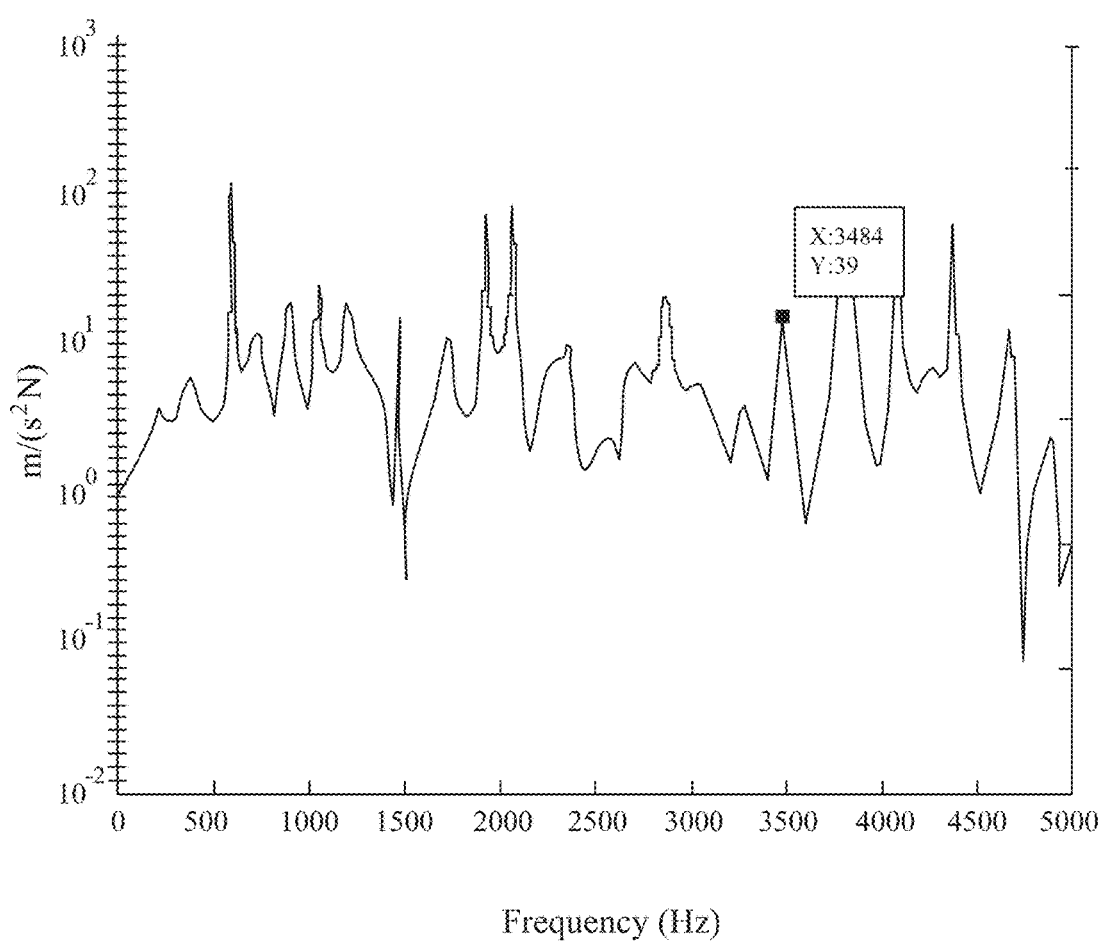

The computer 21 can determine whether the machining process ends; when determining that the machining process does not end, the computer 21 can execute the transmissibility analysis and the frequency response fitting in 7422 RPM to obtain the fitted frequency response functions in X direction and Y direction, and then calculate the natural frequency and the modal damping ratio of the spindle 32 and the cutter 34, as shown in FIG. 9 and FIG. 10.

Figure 11:
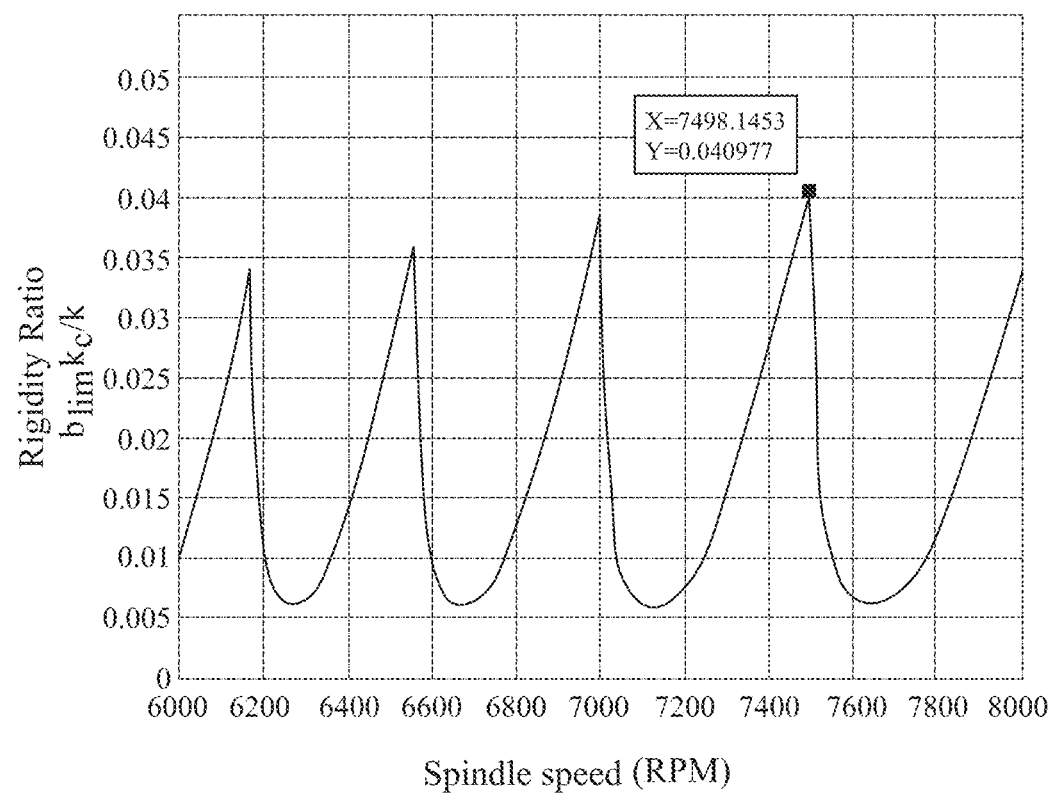

Moreover, the computer 21 can execute the stability lobe diagram analysis again to update the stability lobe diagram according to the natural frequency and the modal damping ratio of the spindle 32 and the cutter 34, as shown in FIG. 11; then, the computer 21 can determine that 7498 RPM is the optimized spindle speed at the moment to replace the current spindle speed, 7422 RPM, and then keep executing the machining process.

Finally, the computer 21 can determine whether the machining process ends. In the embodiment, the machining process ends after the optimized spindle speed is only updated for two times; however, in other embodiments, the optimized spindle speed can keep being updated for a lot of times until the machining process ends.

In the embodiment, the spindle speed adjusting device in machining 2 and the method thereof are compared with the conventional method by the following three factors: (1) Vibration of the spindle 32: a vibration measurement device is mounted on the spindle 32 to measure the vibration of the spindle 32 in different spindle speeds; (2) sound intensity generated during the machining process: a sound measurement device is mounted on the spindle 32 to measure the sound intensity during machining in different spindle speeds; (3) cutting waves on the surface of the workpiece P: the surface roughness of the workpiece P is observed in different spindle speeds.

Figure 12:
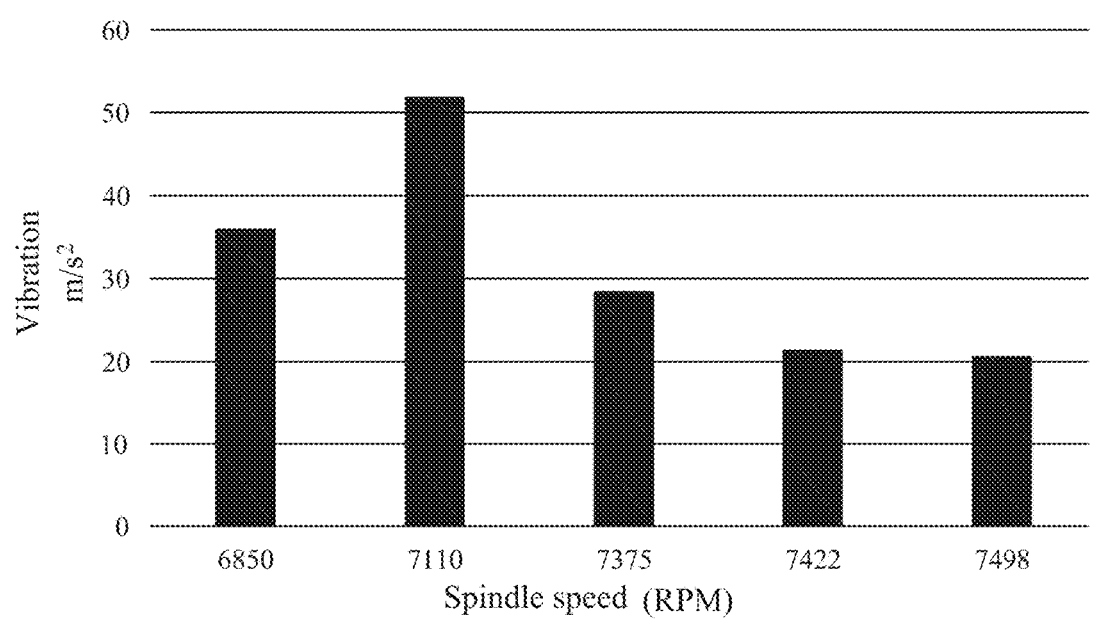
Figure 13:
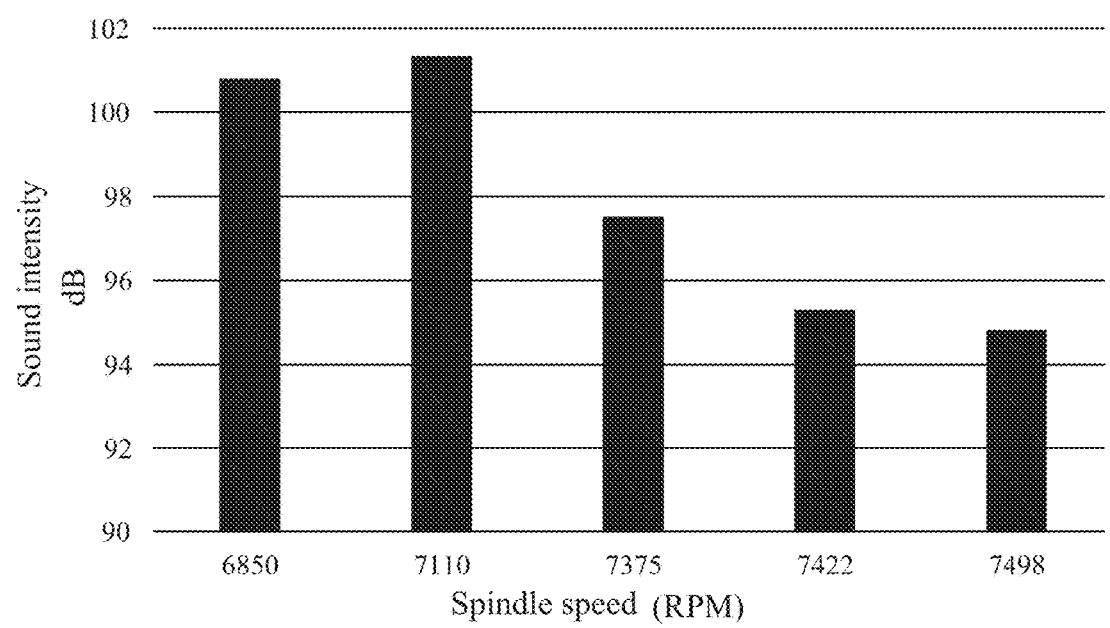

FIG. 12 shows the test result of the spindle vibration; FIG. 13 shows the test result of the sound intensity generated by the machining process. As shown in FIG. 12 and FIG. 13, when the spindle speed is adjusted from 6850 RPM, 7110 RPM and 7375 RPM provided by the conventional method to the optimized spindle speeds, 7422 RPM and 7498 RPM, provided by the embodiment, the vibration and the sound intensity of the spindle are obviously decreased, which are further reduced with the increase of the adjustment times; therefore, it is obviously that the machining process can be more stable after the optimized spindle speed keeps being automatically updated.

Figure 14:
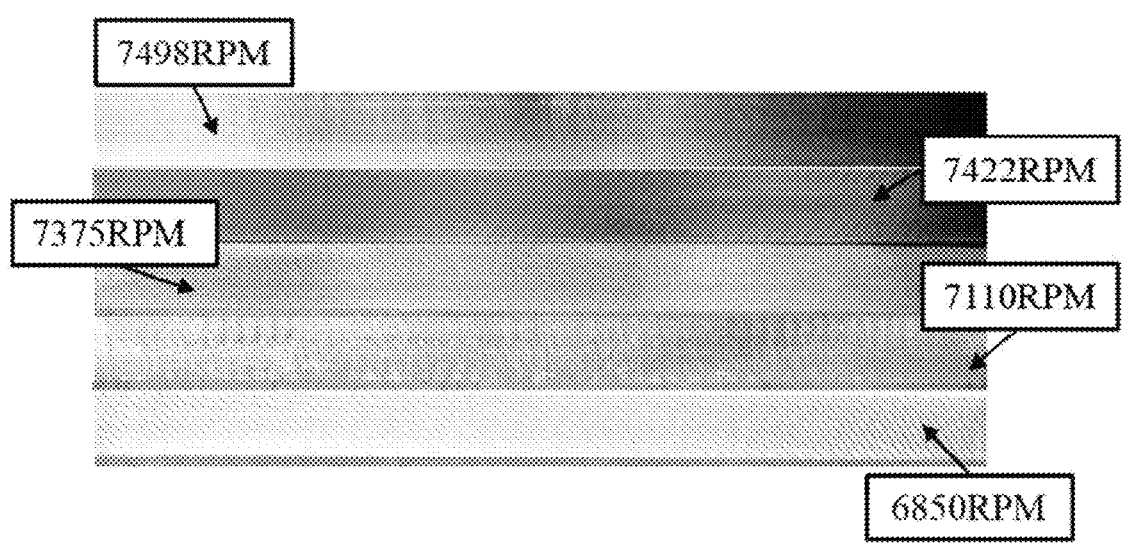

As shown in FIG. 14, it is obviously that the surface roughness of the workpiece P processed by the optimized spindle speed, 7498 RPM, is much better than that of the workpiece P processed by the spindle speeds provided by the conventional method.

To sum up, according to one embodiment of the present disclosure, the signal processing module of the spindle speed adjusting device in machining can execute a stability lobe diagram analysis according to the systematic dynamic parameters of a machining tool so as to precisely calculate an optimized spindle speed of the machining tool, and then make the machining tool operate at the optimized spindle speed; in this way, workpieces can be processed in high machining precision and the machining efficiency can also be increased.

According to one embodiment of the present disclosure, the signal processing module of the spindle speed adjusting device in machining can execute the stability lobe diagram analysis according to the systematic dynamic parameters of the machining tool to calculate the optimized spindle speed of the machining tool in order to prevent from chatter; therefore, the machining tool can machine workpieces without chatter, so the machining quality of workpieces can be effectively improved.

Besides, according to one embodiment of the present disclosure, the signal processing module of the spindle speed adjusting device in machining can repeatedly execute the transmissibility analysis, the frequency response fitting and the stability lobe diagram analysis to update the optimized spindle speed of the machining tool until the machining process ends; in this way, the spindle speed of the machining tool can always be optimized during the whole machining process even if the contact area between the workpiece and the cutter, the moving path of the cutter and other operational conditions change; accordingly, the machining precision of workpieces can be further improved.

Moreover, according to one embodiment of the present disclosure, the signal processing module of the spindle speed adjusting device in machining can execute the transmissibility analysis, the frequency response fitting and the stability lobe diagram analysis in real time to calculate the optimized spindle speed of the machining tool without trail cuts, so can be applied to workpieces with high price; therefore, the application of the spindle speed adjusting device can be more comprehensive.

Furthermore, according to one embodiment of the present disclosure, the signal processing module of the spindle speed adjusting device in machining can execute the transmissibility analysis, the frequency response fitting and the stability lobe diagram analysis, etc., in real time, and the above steps can always find the optimized spindle speed to improve the machining precision even if in different machining parameters (e.g. feed rate, cutting depth and cutting width) and different workpiece material characteristics, which is more flexible in use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A spindle speed adjusting device in machining, comprising:
    a plurality of signal detection modules, each of the signal detection modules keeping measuring a vibration signal generated when a machining tool performing a machining process until the machining process ending;
    a signal capturing module, configured to capture the vibration signals; and
    a signal processing module, configured to execute a transmissibility analysis, comprising a power spectral density function analysis, according to the vibration signals to obtain a transmissibility between the signal detection modules, and execute a frequency response fitting according to the transmissibility to obtain a plurality of system dynamic parameters, and then execute a stability lobe diagram analysis according to the systematic dynamic parameters so as to calculate an optimized spindle speed of the machining tool and make the machining tool operate at the optimized spindle speed;
    wherein the signal processing module repeatedly executes the transmissibility analysis, the frequency response fitting and the stability lobe diagram analysis so as to keep updating the optimized spindle speed until the machining process ends.

2. The spindle speed adjusting device in machining of claim 1, wherein the system dynamic parameters comprise a natural frequency and a modal damping ratio of the machining tool.

3. The spindle speed adjusting device in machining of claim 1, wherein the machining tool comprises a spindle mount, a spindle, a cutter and a cutter holder; the spindle is mounted on the spindle mount, the cutter holder is mounted on the spindle, and the cutter is mounted on the cutter holder.

4. The spindle speed adjusting device in machining of claim 2, wherein the signal processing module executes a curve fitting according to the transmissibility to obtain a curve peak, and then calculate the natural frequency according to the curve peak.

5. The spindle speed adjusting device in machining of claim 3, wherein the signal detection modules are mounted on the spindle.

6. The spindle speed adjusting device in machining of claim 3, wherein the signal processing module executes a numerical analysis according to the natural frequency to identify the modal damping ratio.

7. A spindle speed adjusting method in machining, comprising the following steps:
    keeping measuring a vibration signal generated when a machining tool performing a machining process by a plurality of signal detection modules until the machining process ending;
    capturing the vibration signals by a signal capturing module;
    executing a transmissibility analysis, comprising a power spectral density function analysis, according to the vibration signals by a signal processing module to obtain a transmissibility between the signal detection modules;
    executing a frequency response fitting according to the transmissibility by the signal processing module to obtain a plurality of system dynamic parameters;
    executing a stability lobe diagram analysis according to the systematic dynamic parameters so as to calculate an optimized spindle speed of the machining tool by the signal processing module and make the machining tool operate at the optimized spindle speed; and
    repeatedly executing the transmissibility analysis, the frequency response fitting and the stability lobe diagram analysis by the signal processing module so as to keep updating the optimized spindle speed until the machining process ending.

8. The spindle speed adjusting method in machining of claim 7, wherein the system dynamic parameters comprise a natural frequency and a modal damping ratio of the machining tool.

9. The spindle speed adjusting method in machining of claim 8, further comprising the following step:
    executing a curve fitting according to the transmissibility to obtain a curve peak, and then calculate the natural frequency according to the curve peak by the signal processing module.

10. The spindle speed adjusting method in machining of claim 9, further comprising the following step:
    executing a numerical analysis according to the natural frequency by the signal processing module to identify the modal damping ratio.

* * * * *